United States Patent
Matsuda (10) Patent No.: US 9,152,137 B2
(45) Date of Patent: Oct. 6, 2015

(54) DEVICE ACTIVATING UNIT AND CPU

(75) Inventor: Seiichi Matsuda, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 1275 days.

(21) Appl. No.: 13/024,518

(22) Filed: Feb. 10, 2011

(65) Prior Publication Data

US 2011/0225393 A1 Sep. 15, 2011

(30) Foreign Application Priority Data

Mar. 12, 2010 (JP) .................................. 2010-056525

(51) Int. Cl.
*G05B 19/042* (2006.01)

(52) U.S. Cl.
CPC .... *G05B 19/042* (2013.01); *G05B 2219/25472* (2013.01)

(58) Field of Classification Search
None
See application file for complete search history.

(56) References Cited

U.S. PATENT DOCUMENTS

| | | | | |
|---|---|---|---|---|
| 6,549,990 | B2 * | 4/2003 | Hughes et al. | 711/146 |
| 7,028,166 | B2 * | 4/2006 | Pickett | 712/216 |
| 2011/0225393 | A1 * | 9/2011 | Matsuda | 712/31 |

FOREIGN PATENT DOCUMENTS

| | | |
|---|---|---|
| JP | 63-168762 A | 7/1988 |
| JP | 6-222011 A | 8/1994 |
| JP | H11-338735 A | 12/1999 |
| JP | 2000-099195 A | 4/2000 |
| KR | 10-2005-0029104 A | 3/2005 |

OTHER PUBLICATIONS

Japanese Office Action, dated Mar. 13, 2013, which issued during the prosecution of Japanese Patent Application No. 2010-056525, to which the present application claims priority.

* cited by examiner

*Primary Examiner* — Corey S Faherty
(74) *Attorney, Agent, or Firm* — Troutman Sanders LLP (57) ABSTRACT

A register circuit having a plurality of registers enabling the writing and reading of data by the specification of an address; a register controlling circuit monitoring data of a plurality of registers of the register circuit through the specification of an address, and writing, to a register pre-established in the register circuit, for activating devices; and a signal transmitting circuit causing a device to execute a specific operation, based on a specified address and on data read from the register circuit are provided; and not only is a collection of first bits for controlling jointly the individual operations of the plurality of devices assigned in a first register that is established in advance in the plurality of registers, but also second bits for controlling individually the individual operations in the plurality of devices are assigned respectively in a plurality of respective second registers that differ from the first register.

7 Claims, 8 Drawing Sheets

| Address | Register | bit 7 | bit 6 | bit 5 | bit 4 | bit 3 | bit 2 | bit 1 | bit 0 |
|---|---|---|---|---|---|---|---|---|---|
| 0x0000 | A | A_Run | A_Enable | \multicolumn{6}{c}{A_Count} | | | | | |
| 0x0001 | B | B_Run | B_Enable | B_Count | | | | | |
| 0x0002 | C | C_Run | C_Enable | C_Count | | | | | |
| 0x0003 | D | D_Run | D_Enable | D_Count | | | | | |
| 0x0004 | E | E_Run | E_Enable | E_Count | | | | | |
| 0x0005 | F | F_Run | F_Enable | F_Count | | | | | |
| 0x0006 | G | G_Run | G_Enable | G_Count | | | | | |
| 0x0007 | H | H_Run | H_Enable | H_Count | | | | | |

FIG. 7

| Address | Register | bit 7 | bit 6 | bit 5 | bit 4 | bit 3 | bit 2 | bit 1 | bit 0 |
|---|---|---|---|---|---|---|---|---|---|
| 0x0000 | A | | | | | A_Count | | | |
| 0x0001 | B | | | | | B_Count | | | |
| 0x0002 | C | | | | | C_Count | | | |
| 0x0003 | D | | | | | D_Count | | | |
| 0x0004 | E | | | | | E_Count | | | |
| 0x0005 | F | | | | | F_Count | | | |
| 0x0006 | G | | | | | G_Count | | | |
| 0x0007 | H | | | | | H_Count | | | |
| 0x0008 | J | A_Run | B_Run | C_Run | D_Run | E_Run | F_Run | G_Run | H_Run |

DEVICE ACTIVATING UNIT AND CPU

CROSS REFERENCE TO RELATED APPLICATIONS

The present application claims priority under 35 U.S.C. §119 to Japanese Patent Application No. 2010-056525, filed Mar. 12, 2010, which is incorporated herein by reference,

FIELD OF TECHNOLOGY

The present invention relates to a device activating technology for activating a plurality of devices.

BACKGROUND OF THE INVENTION

Substrate inspecting devices for inspecting substrates by capturing images from a plurality of video cameras have been developed in order to inspect whether or not there are defects in manufactured products such as substrates. For example, Japanese Unexamined Patent Application Publication H6-222011 ("JP '011") discloses a substrate inspecting device that uses a video signal that performs interlacing alternating between odd frames and even frames. In this substrate inspecting device, horizontal synchronization signals that are offsetted by ½ the horizontal synchronization period are applied to each of a set of mutually-facing video cameras, where odd-frame images are captured by one video camera set, and even frame images are captured by the other video camera set. Doing so enables continuous and high-speed analysis of inspection regions of manufactured products.

However, in the substrate inspecting device as set forth in JP '011, it is necessary to control the timing of the imaging in the plurality of video cameras based on a synchronization signal. If an attempt were made to control the timing of the activation of the individual video cameras without connections for supplying the synchronization signals, then time measuring means, such as a counter, would have to be used, and the timing of activation would have to be controlled based on the counting value of the counter.

In activation control using such a counter, a register is assigned to each device, and the control of the timing of activation for the devices is performed based on the register counts. For example, after the counter is activated, an operation is repeated wherein the number of the specific register is changed each time a specific count elapses, to measure the passage of time, where the counting is ended when the register count goes to zero, or the like, indicating that a specific amount of time has elapsed since the commencement of counting. Once the counting of the elapsed time by the counter has ended, then this must be detected without delay, and activating data must be written to the register without delay to reactivate the counter.

However, because it is necessary for the reading and writing of registers by the controlling circuit to be performed sequentially for each register, in some cases there will be a substantial delay in the timing with which the data of the register is read after the register count has reached zero. If the detection of the end of counting in any of the counters is delayed, then the timing of the reactivation will be late, preventing the commencement of the image capturing from being performed with the correct timing.

Given this, one object of the present invention is to provide a device controlling unit and CPU (central processing unit) able to operate without delay even when there is a plurality of devices that are not synchronized to each other.

SUMMARY OF THE INVENTION

A device controlling unit according to the present invention, in order to resolve the problem set forth above, is a device controlling unit for controlling at least a portion of operations of a plurality of devices, having:

a register circuit having a plurality of registers configured so as to enable writing and reading, of data by specifying an address;

a register controlling circuit for monitoring data of the plurality of registers of the register circuit, through specifying the address, and for writing data to a register, determined in advance, of the register circuit to activate a device; and a signal transmitting circuit for causing one of the plurality of devices to perform a specific operation based on the specified address and on data read out from the register circuit; wherein:

in the register circuit, a collection of first bits for controlling jointly the individual operations of the plurality of devices is assigned to a first register, established in advance in the plurality of registers, and second bits for controlling individually the individual operations of the plurality of devices are respectively assigned to a plurality of respective second registers other than the first register.

In the invention above, while a shared first register is assigned for controlling the operations of a plurality of devices, individual second registers are also assigned for controlling the operations of individual devices. Consequently, while it is possible to ascertain the operating state of any or all of the devices simultaneously by referencing the collection of first bits in the first register, it is possible to start the operation of individual devices with the respective timings by writing data to a second bit in a corresponding second register for a device that has ended its operation. Furthermore, operations of a plurality of devices can be started simultaneously by writing data to a plurality of first bits.

Forms such as the following can be applied to the present invention as desired:

A device controlling unit as set forth above, wherein: the register controlling circuit writes, to a second bit of a second register that has been assigned to a device, data commanding an operation of the device, when any of the collection of first bits of the first register indicates that an operation of the device has ended.

A device controlling unit as set forth above, wherein the signal transmitting circuit outputs a permission signal, for allowing the operation of the device assigned to the second register, when data read from a second register, specified by a specified address, is data for causing the operation of any of the plurality of devices.

A device controlling unit as set forth above, wherein: the signal transmitting circuit writes, to a first bit of a first register that is assigned to a device that has ended an operation, data indicating the end of an operation of a device, when an operation of any of the plurality of devices has ended.

A device controlling unit as set forth above, wherein: a device is a video camera, a counter, or a sequencer.

A device controlling unit as set forth above, wherein: the register circuit uses at least a portion of bits other than bits used for controlling at least a portion of the operations of the plurality of devices as a counter for counting elapsed time from the beginning of operations of a plurality of devices.

A CPU that incorporates a device controlling unit as set forth above.

The present invention is provided with a first register for controlling jointly the operations of a plurality of devices, and second registers for controlling individually the operations of the devices, thus enabling detection of the operating states of a plurality of devices without delay, and enabling starting of the operations of a plurality of devices, either with individual timing or simultaneously.

DETAILED DESCRIPTION OF THE INVENTION

Examples according to the present invention are explained below. In the descriptions of the diagrams below, parts that are identical or similar are expressed by identical or similar codes. Note that the individual blocks described in the figures are described divided according to function, for convenience. Consequently, insofar as the desired effect of operation are obtained, the structure of the blocks described in the figures may be used after appropriate modifications through design changes. Additionally, each block structure may be embodied in hardware, or are means that may be embodied functionally through software.

The terminology used in the present invention is as defined below:

"Device" refers in general to devices that are subject to device control, including, for example, video cameras, counters, and sequencers.

"Data" refers to information that is expressed by a single bit that structures a register, but includes also cases indicating information for controlling a. single device using multiple bits. For example, the "data" will be "1" or "0", expressed by a single bit, when controlling the start Or end of an operation of a. device.

"Operation" refers to a process in the device, established in advance in accordance with a specific objective. For example, when the device is a video camera, the "operation" means capturing an image. If the device is a counter, then the "operation" refers to counting.

"Activate" is not limited to the narrow meaning of simply turning ON the power of a device, but includes also causing a variety of functions to be exhibited within the device.

"Control" is a concept that includes at least ascertaining the operating state of a device and starting a process by writing data to an appropriate bit.

"First Register" refers to a register for joint control of the operations of a plurality of devices. The "first register" preferably is a single register by which the operations of a plurality of devices can be controlled; however, in the event that the number of devices exceeds the number of bits in a register, a plurality of registers can be assigned as "first registers." The operating states of a plurality of devices can be ascertained simultaneously through referencing the plurality of bits in the "first register," and the operations of a plurality of devices can be started simultaneously through writing data simultaneously to a plurality of bits thereof.

"Second Register" refers to a register for controlling the operations of a plurality of devices individually. An operation of an assigned device is started through writing the aforementioned "data," established in advance, to the "second register." The operating states of the corresponding device can be ascertained individually through referencing the bit of the "second register" assigned to the device, and the operation of the corresponding device can be started individually through writing data to the bit that is assigned to the device.

"Simultaneously Operation Devices" refers to a plurality of devices for which the operations are to be started simultaneously. Any number of devices, numbering at least two, may be simultaneous operation devices.

An example according to the present invention relates to an inspecting device provided with a plurality of video cameras for performing pass/fail inspections on substrates, and the like, and, in particular, includes a device controlling unit according to the present invention, In the device controlling unit according to the first form of embodiment, devices that are subject to operational control (video cameras) are assigned to individual bits of a first register for jointly controlling the operations, and also assigned to multiple second registers for controlling the operations of the devices individually.

Figure 1:
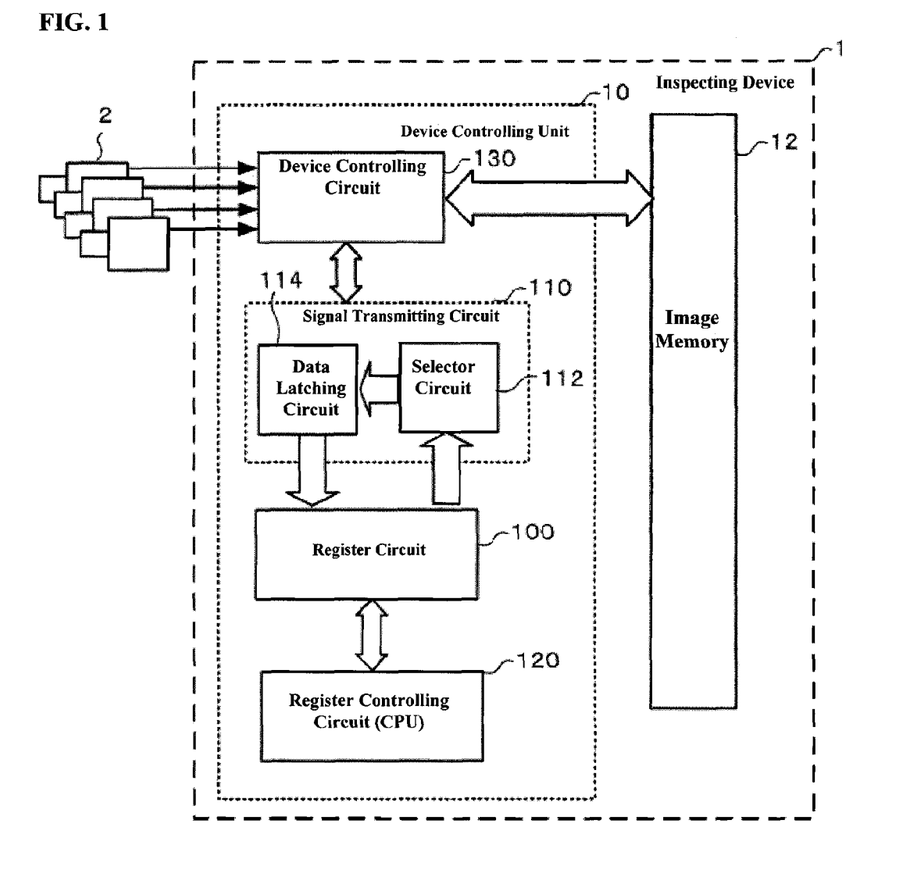
FIG. 1 is a structural diagram of an inspecting device that includes a device controlling unit according to an example.

FIG. 1 illustrates the structure of an inspecting device 1 according to an example. As illustrated in FIG. 1, the inspecting device 1 comprises a plurality of video cameras 2, a device controlling unit 10, and an image memory 12.

A video camera 2 is an example of a device that is subject to the operational control according to the present invention, and video cameras are provided in the same quantity (for example, eight video cameras) as the number of bits that structure a register in the register circuit 100. Each individual video camera is also termed a "device x" (where x=A through H). Each individual video camera 2 is structured so as to capture, in frame units, images of an object being inspected (for example, a substrate), and to send the image as image data to the image memory 12 through the device controlling unit 10. For example, the plurality of video cameras 2 capture images of specific regions on the substrate with identical timing. The image data that is captured simultaneously is referenced by a. processing device, not shown, in order to make mutual comparisons, for example. As a particularly distinctive feature of the present invention, no wires are provided between the video cameras 2 to perform synchronization referencing a synchronization signal. Moreover, in the present form of embodiment, all of the plurality of video cameras 2 are assigned to "simultaneous operation devices" in order to start the operation thereof simultaneously.

The video memory 12 is structured so as to be able to update storage wherein the plurality of image data correspond to the individual video cameras 2. The video data stored in the video memory 12 can be referenced by the processing device, not shown.

In the present invention, the device controlling unit 10 is provided with a register circuit 100, a signal transmitting circuit 110, a register controlling circuit 120, and a device controlling circuit 130. Of these, the register controlling circuit 120 is a central processing unit (CPU). The register circuit 100 and the signal transmitting circuit 110 may be structured as a specialty integrated circuit (FPGA or ASIC).

The register circuit 100 has a plurality of registers that are structured so that data can be written or read through the specification of an address, In the register circuit 100, a particular register that is determined in advance, from among the plurality of registers, is assigned as the "first register" for controlling jointly the operations of a plurality of devices, Additionally, of the plurality of registers, the plurality of registers other than the first register is assigned as "second registers" for controlling the operations of the devices individually.

Figure 2:
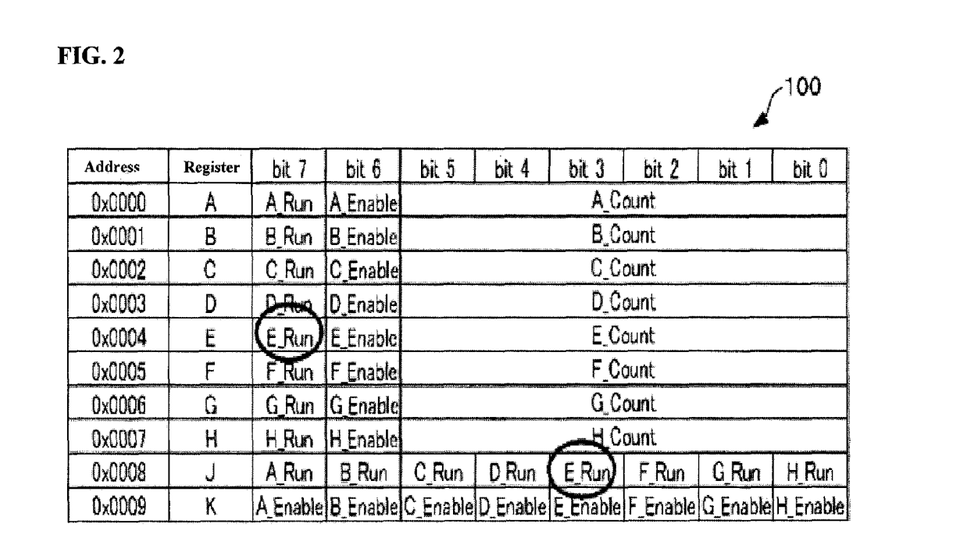
FIG. 2 is a register structure diagram of a register circuit of the example.

FIG. 2 illustrates the details of an example of assigning the registers of the register circuit 100 in the present form of embodiment. As illustrated in FIG. 2, in this example the register circuit 100 is provided with registers A through K that each are structured from eight bits (bit 7 through bit 0). The registers A through K are structured so as to be accessible, for example, by addresses 0x0000 through 0x0009. Of the registers A through K, register J (address 0x0008) is assigned as the aforementioned first register, and registers A through the H are assigned as the aforementioned second registers. In the first register J, each of the bits, bit 7 through bit 0, are assigned as the collection of "first bits" for starting the individual operations of the devices A through H. In the second registers A through H, bit 7 is assigned as a "second bit" for controlling the operations of the respective individual devices A through H. Moreover, bit 6 in the second registers A through H is assigned as a permission bit for enabling the individual devices. Furthermore, the six bits, bits 5 through 0 in the second registers A through H are used as counters for measuring the elapsed time from the beginning of operations of the individual devices. For simplicity in the discussion, the explanation regarding the permission will be omitted below. in particular, in the present example, the first register J is used in order to start the operations of a plurality of devices simultaneously, Returning to FIG. 1, the register controlling circuit 120 is structured so as to be able to monitor the data (the logical states of the bits) of the plurality of registers in the register circuit 100 through the specification of an address, and so as to enable writing of data (for example, the logical state "1" of the bit) in order to start the operation of a device, Moreover, the register controlling circuit 120 writes, to the second register that is assigned to the applicable device, data to command the start of operation of that device when the logical state of a first bit in the first register indicates that the operation of the device has ended. The register controlling circuit 120 is embodied functionally, for example, through the execution of a software program on a central processing unit (CPU).

Specifically, the register controlling circuit 120 writes, to the corresponding second register, data commanding the start of operation of the device (for example, bit logic "1," both here and below) when any of the first bits in the first register J indicates the end of the operation of the device (for example, when the bit logic is "0," both here and below).

In particular, in the present example, all of the bits 7 through 0 that structure the first register J are assigned to "simultaneous operation devices" (video cameras A through H) that are to start operations simultaneously. Consequently, the register controlling circuit 120 is structured so as to be able to write, to the first register J, data to start the operation of the simultaneous operation devices when all of the bits 7 through 0 indicate that the operations have ended.

The signal transmitting circuit 110 is structured so as to be able to start the operation of any device of the plurality of devices based on a specified address and on data read out from the register circuit. Specifically, the signal transmitting circuit 110 reads out the data of the second bit of a second register that is specified by a specified address, and if the data that has been read out is data for starting the operation of any of the plurality of devices, outputs a permission signal to enable the operation of the device assigned to the second register. Moreover, the signal transmitting circuit 110 is structured so as to be able to write data indicating the end of the operation of the device to both the corresponding first bit in the first register and the second bit of the second register that is assigned to a device that has ended its operations in the case that any device of the plurality of devices has ended its operation.

Figure 3:
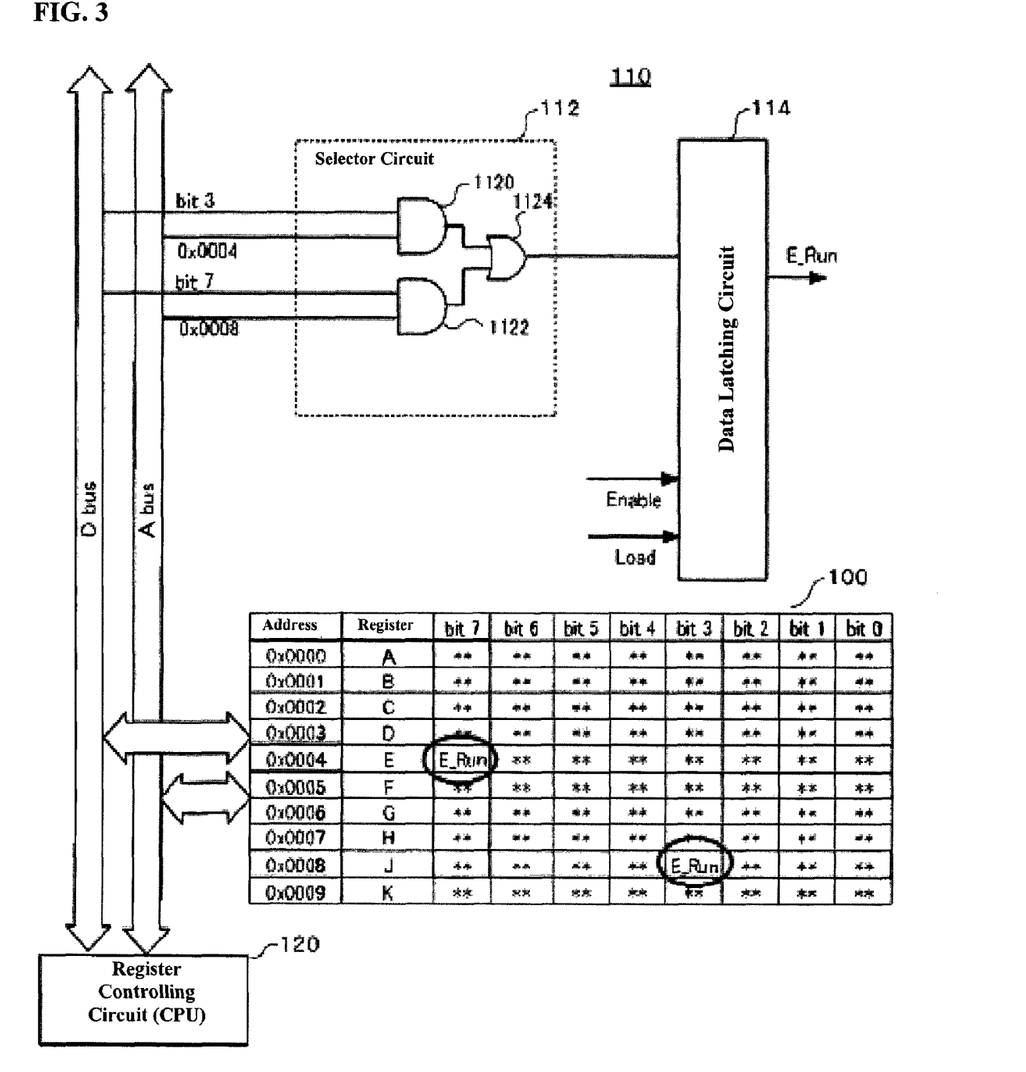
FIG. 3 is a structural diagram of a signal transmitting circuit of the example.

FIG. 3 illustrates a specific structure for a signal transmitting circuit 110. As illustrated in FIG. 3, the signal transmitting circuit 110 is provided with, for example, a selector circuit 112 and a data latching circuit 114. These structures are diagrams that are illustrated schematically in order to explain the detection of the end of operation based on data that is stored in the first register and explain the outputting of the permission signal for enabling the start of operation of the device.

A selector circuit 112 and a data latching circuit 114 is provided for each device, For simplicity in the discussion, FIG. 3 illustrates a combination of a selector circuit 112 for selecting the device corresponding to the second register E and the data latching circuit 112. Actually, in the present example, the register circuit 100 is structured so as to enable the selection of eight devices, and thus there are eight sets of combinations of selector circuits 112 and data latching circuits 114, matching the number of devices that can he selected.

The register controlling circuit 120 outputs, onto an address bus Abus an address for accessing one of the registers of the register circuit 100. The data of the register read out by the access by the register controlling circuit 120 is outputted onto a data bus Dbus.

The selector circuit 112 is provided with, for example, AND gates 1120 and 1122, and an OR gate 1124. The AND gate 1120 of the selector circuit 112 is structured so as to output the data value of the first bit (bit 3 in register J) when the first register J is accessed (address 0x0008). The AND gate 1122 of the selector circuit 112 is structured so as to output the data value of the second bit (bit 7 in register E) when the second register is accessed (address 0x0004). The OR gate 1124 is structured so as to output the logical sum of the outputs of the AND gate 1120 and the AND gate 1122.

The data latching circuit 114 is structured from a data latch or a flip-flop. The data latching circuit 114 latches the output data Data of the selector circuit 112 with the timing of a load signal Load outputted by the register controlling circuit 120. Following this, the output data Data is outputted as a permission signal Run for the individual device when an enable signal Enable is outputted, for the device corresponding to the activation register E, from the register controlling circuit 120.

Outputs are enabled matching the permission timing for each device, for either the activation data of the register that has been set as the simultaneous activation register or the register that has been set as the individual activation register, through the selector circuit 112 and the data latching circuit 114.

Additionally, upon receipt, from the device controlling circuit 130, of a notification to the extent that any of the devices has ended its operation, the signal transmitting circuit 110 writes end-of-operation data, indicating the end of an operation of a device, to a monitoring register that is assigned to the device that has ended the operation. The signal transmitting circuit 110 also writes end-of-operation data, indicating the end of the operation of the device, to data for the activating register corresponding to the device that has ended the operation, provided separately from the monitoring register. In the present example, if, for example, the device E has ended its operation, then bit 3 of the selecting first register J is reset (written with the bit logic "0"), and bit 7 of the corresponding activating second register F is also reset. The resetting of the registers by the signal transmitting circuit 110 is preferably achieved in hardware. This is because doing so in a hardware process makes it possible to reflect the end of the operation of the device as data, without delay, to the register upon the end of the operation by the device.

Upon reception of a permission signal Run for a device from the device controlling device 10, the device controlling circuit 130 activates the corresponding device. When image data is provided from the corresponding device, the device controlling circuit 130 forwards that image data to the image memory 12. When the transfer of the image data from the corresponding device has ended, then the device controlling circuit 130 provides the signal transmitting circuit 110 with a notification that the operation of the device has ended.

Figure 6:
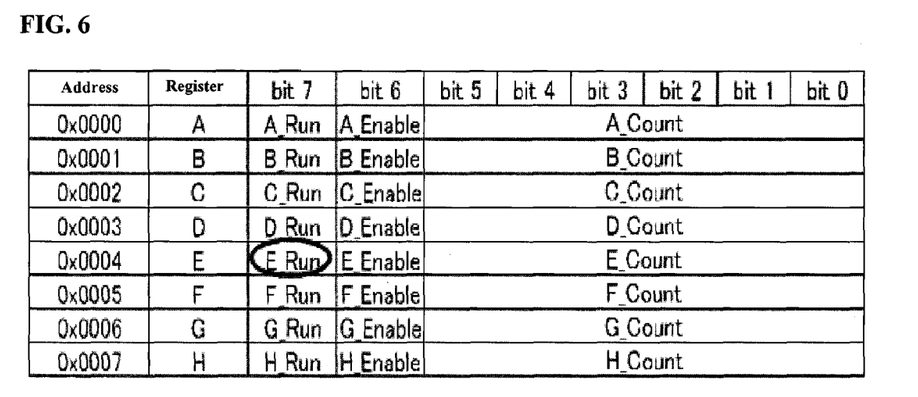
FIG. 6 is an example of an inconvenient method of use when using the register.
Figure 7:
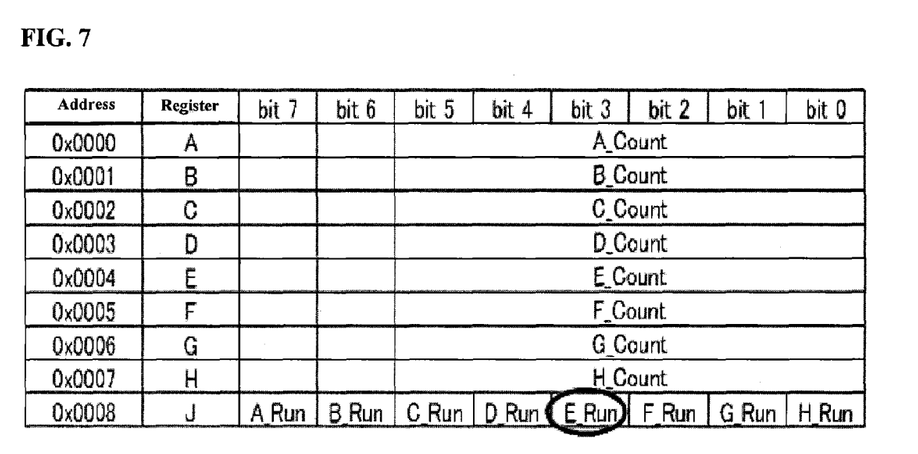
FIG. 7 is an example of another inconvenient method of use when using the register.

For ease in understanding the benefits of the present invention, the problem areas in the controlling activation through a register are explained based on FIGS. 6 and FIG. 7.

In a device controlling unit wherein dedicated synchronization connection lines for synchronizing the devices are not provided, the controlling circuit (CPU) monitors the end of operation of the devices, and performs control so as to start the operations of the devices. Typically, one may consider controlling devices through registers that the controlling circuit controls directly. As methods wherein registers are used, there is a. method wherein devices are assigned corresponding to registers, and a method wherein devices are assigned corresponding to individual bits of a single register.

FIG. 6 is a register assignment diagram for explaining a method. As illustrated in FIG. 6, in this method, devices A through H are assigned corresponding to the respective registers A through H, and the individual registers are used as registers for starting the operations of the devices and as registers for monitoring the states of operation of the devices.

When monitoring the end of operations of the individual devices, the same bit as the bit that is written with the activation data (hereinafter termed the "control bit") of a register, corresponding to the device that is subject to monitoring, is referenced, When the operation of an individual device has ended, then end-of-operation data (for example, the bit logic of "0"), indicating that the operation has ended, is written to the control bit of the register that is assigned to the device, the register controlling circuit monitors the control bit of the register that is assigned to the device that is subject to monitoring. When the end-of-operation data is written, processing then moves to the next process, such as writing activation data in order to reactivate.

On the other hand, when activating each individual device individually, activation data (for example, bit logic "1") that commands activation is written to the control bit of the register to which the activation data is to be written (for example, bit 7) that is assigned to the device that is to be activated. When activation data is written, activation data is outputted to the device controlling circuit from the signal transmitting circuit, structured as in FIG. 3, above, to activate the device that is to be activated.

The method described above makes it possible to activate devices individually with arbitrary timing. However, on the other hand, the registers must be accessed sequentially, and thus it is not possible to detect immediately the end of operations of a plurality of devices. This results also in a shortcoming that is not possible to activate a plurality of devices simultaneously.

For example, if, in FIG. 6, the register E at address 0x0004 is read and the control bit (bit 7) is at the end-of-operation data "0", then the conclusion is drawn that the operation of the device F has ended, and the device can be reactivated by writing an activation data "1" to this same control bit (bit 7). Here there is a possibility that during this process other devices end the operations thereof later. However, if, in the first method, the control bits of the registers are not referenced sequentially, then it would not be possible to detect the end of operations of the respective devices. Additionally, even if it were determined that there is another device wherein the operation thereof ended at essentially the same time, it would not be possible to activate that other device by writing activation data to the control bit of the register corresponding to that other device until after device E has been activated first.

FIG. 7 is a diagram of the register assignments for explaining another method. As indicated in FIG. 7, in this method, all of the devices A through H are assigned to a single register J, and the individual bits in the register are assigned as control bits for starting the operations of the corresponding devices and for detecting the operating states of the corresponding devices.

The data of the control bits of the register are read in and referenced to detect the end of operations of the individual devices. When the operations of the individual devices have ended, an end-of-operation data (for example, bit logic "0") that indicates the end of the operation is written to the control bit that is assigned to the device that is being monitored. The register controlling circuit references the control bit that is assigned to the device that is being monitored. If the end-of-operation data "0" is written to the control bit, then it can be confirmed that the device that is being monitored has ended its operation.

On the other hand, when activating the device, data for starting the activation (for example, bit logic "1") is written to the control bit that is assigned to the device to be activated. Normally, the register cannot be written by the bit unit, and thus activating data (for example, the bit logic "1") for starting operations is written simultaneously to the control bits assigned to other devices as well. This is not a problem if all of the devices other than the device that is being activated are already operating. Activating data may be written that causes the bit logic for the control bits other than the control bit corresponding to the device to be activated to go to "1", When activating data is written to any of the control bits, then activating data is outputted to the device controlling circuit by the signal transmitting circuit that is structured as in FIG. 3, above, reactivating the device that is being activated. The operating state does not change for any device that is already operating.

In the second method set forth above, the ends of operations of a plurality of devices can be detected simultaneously by writing end-of-operation data to a plurality of control bits simultaneously. However, in most cases the starting and ending timings of the devices will differ, meaning that the control bits corresponding to the other devices, with different timings, will be changed into end-of-operation data. In an unfortunate event, the entire register may be written with activating data, because of a device for which the end of operation has already been detected, prior to one of the control bits being changed to the end-of-operation data. That is, events may move forward in a sequence wherein a first device completes its operation, followed by the detection of the end of operation of the first device through a reference to the control bit corresponding to the first device, followed by the end of the operation by a second device, followed by an activation command to the control bit corresponding to the first device, followed by the detection of the end of operation of the second device by referencing the control bit corresponding to the second device. In this case, the control bit that has been changed to the end-of-operation data (for example, bit logic "0") will be overwritten by the activating data (for example, bit logic "1"). overwritten, then the end of the operation of the device is not detected.

Additionally, even when there is a plurality of devices that have ended their operations, it is not possible to activate a plurality of devices with individually differing timings, without commanding simultaneous activation by writing the activating data all at once. In FIG. 7, for example, if the register J at address 00x0008 is read and the control bit (bit 3) is the end-of-operation data "0", then it can be concluded that the operation of device E has ended. If the other control bits (other than bit 3) are not the end-of-operation data, it can be concluded that the only device that has ended its operation is device E, and thus device E is reactivated by writing the data. 0xF F (wherein all bits are "1") to register J. However, if the operation of another device is ended during this reactivating process, than, as described above, it is not possible to detect the end of that operation. Furthermore, it is not possible to start the devices A through H, which are assigned to the register J, individually, with different timings.

Basically, while it is possible to use the method, set forth above, to activate the plurality of devices with different timings, there is the shortcoming that it is not possible to monitor the operating states of the plurality of devices simultaneously. On the other hand, while it is possible to use the other method, set forth above, to monitor the operating states of the plurality of devices simultaneously, and to activate the plurality of devices simultaneously, there is a shortcoming in that it is not possible to activate the individual devices with different timings.

The operation in the present example is explained next. As described above, the register circuit 100 has the following distinctive features:

A specific register J, determined in advance from among the plurality of registers A through K is assigned as a first register for controlling jointly the operations of the plurality of devices A through H;

Registers A through H, other than the first register J, are assigned as second registers for controlling individually the plurality of devices A through H; and Of the plurality of devices A through H, simultaneous operation devices A through H are all assigned to the first register J.

Moreover, if any of the group of first bits (bits 7 through 0) of the first register J indicates the end of the operation of a device (for example, a bit logic "0"), the register controlling circuit 120 writes activating data (for example, bit logic "1") for commanding the activation of the device to the second bit of the second register A through H that is assigned to the device for which the operation has ended. Moreover, if a plurality of first bits of the first register J all indicate ends of operations (for example, bit logic "0"), then the register controlling circuit 120 writes, to the plurality of first bits, the activating data (for example, 0xFF) that commands the simultaneous activation of the simultaneous operation devices A through H.

Figure 4:
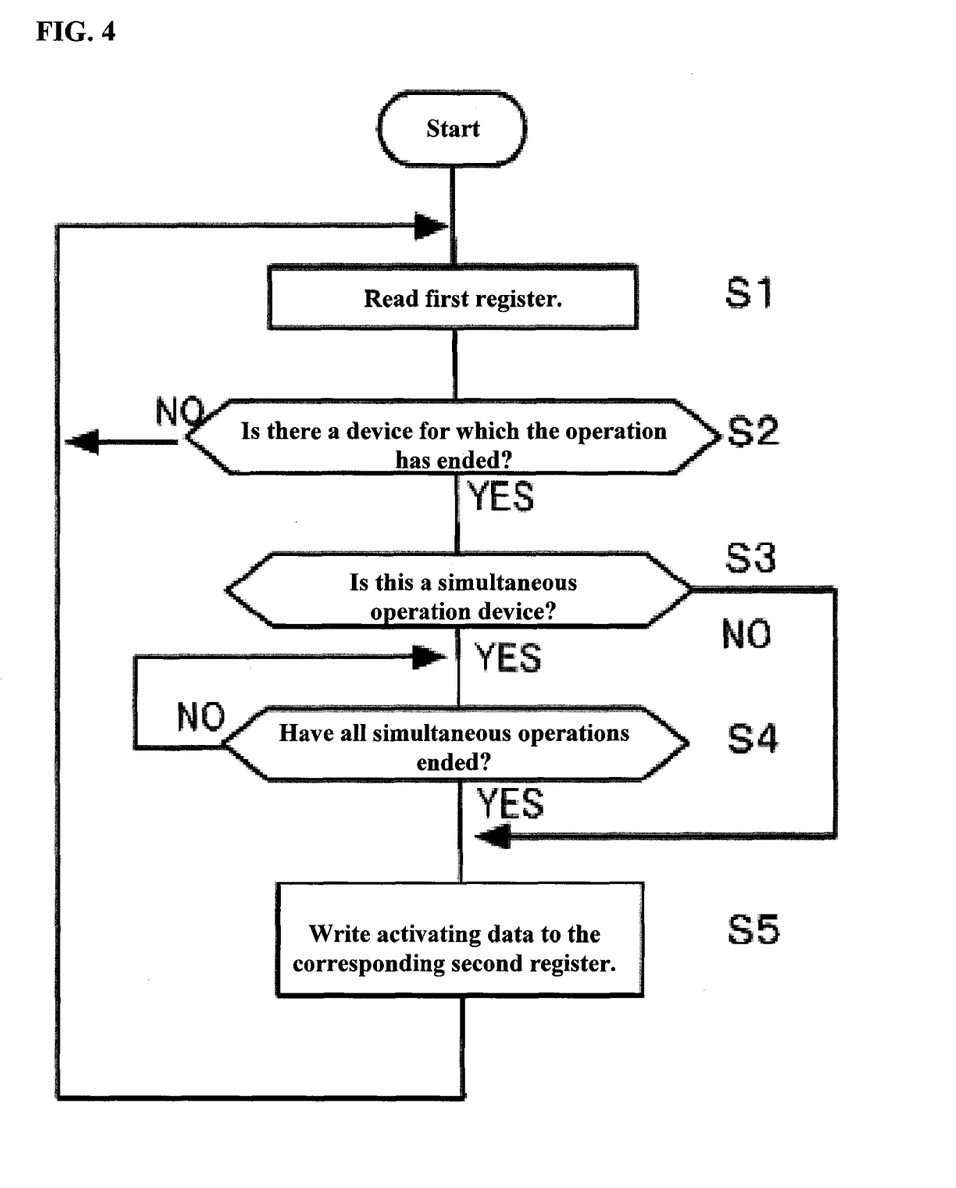
FIG. 4 is a flowchart for explaining the operation of a register controlling circuit.

The register controlling method according to an example that uses the register circuit 100, structured as set forth above, is explained next in reference to the flow chart in FIG. 4. The flow chart in FIG. 4 is for explaining a process that is executed by the register controlling circuit 120, which is achieved through execution of a software program by the register controlling circuit 120, which is a CPU.

In Step S1, the register controlling circuit 120 reads the data. of the first register J of the register circuit 100. For this process, address 0x0008 is outputted to the address bus Abus, and data reflecting the operating states of the devices A through H is outputted to the data bus Dbus. Following this, processing advances to Step S2, wherein the register controlling circuit 120 evaluates whether or not there is any first bit in the first register J that is the end-of-operation data (which here is bit logic "0"). If the result is that there is no end-of-operation data included in the data outputted from the first register J (NO), then processing returns again to the process for monitoring the first register J (S1).

If, in Step S2, end-of-operation data is included in the output data from the first register J (YES), then processing advances to Step S3, and an evaluation is made as to whether or not the device that is assigned to the first bit for which the data was end-of-operation data has been set in advance as a simultaneous activation device. If it has been set as a simultaneous operation device (YES), then processing advances to Step S4, and an evaluation is performed as to whether or not all of the first bits corresponding to the other devices that are set as the simultaneous activation devices have changed to end-of-operation data. If the result is that there is a device, among the devices set as simultaneous activation devices, for which the data has not been set to the end-of-operation data (NO), then processing awaits the data for all of the simultaneous activation devices becoming end-of-operation data.

If all of the first bits corresponding to the devices that are set as simultaneous activation devices have changed to end-of-operation data (YES), processing advances to Step S5, and the register controlling circuit 120 writes activating data (which here is bit logic "1") both to the first bits corresponding to the simultaneous activation devices in the first register and the second bits, of the plurality of second registers, corresponding to the simultaneous activation devices. That is, address 0x008 is outputted to the address bus Abus, and data 0XFF is written through the data bus Dbus to the first register J. Processing then goes to the process for reading the first register (S1).

On the other hand, in Step S2, if the device that is assigned to the first bit that has changed to the end-of-operation data in the first register is not a simultaneous activation device (NO), then it is determined that the device to be activated is an individual activation device. Given this, processing advances to Step S5, and the register controlling circuit 120 writes activating data to the second bit of the second register that is assigned to the device that is to be activated. In the case wherein the second device is device E, for example, then 0x0004 is outputted to the address bus Abus, the second register E is accessed, and activation data (which here is bit logic "1") is written to the second bit (at least to bit 7).

Figure 5:
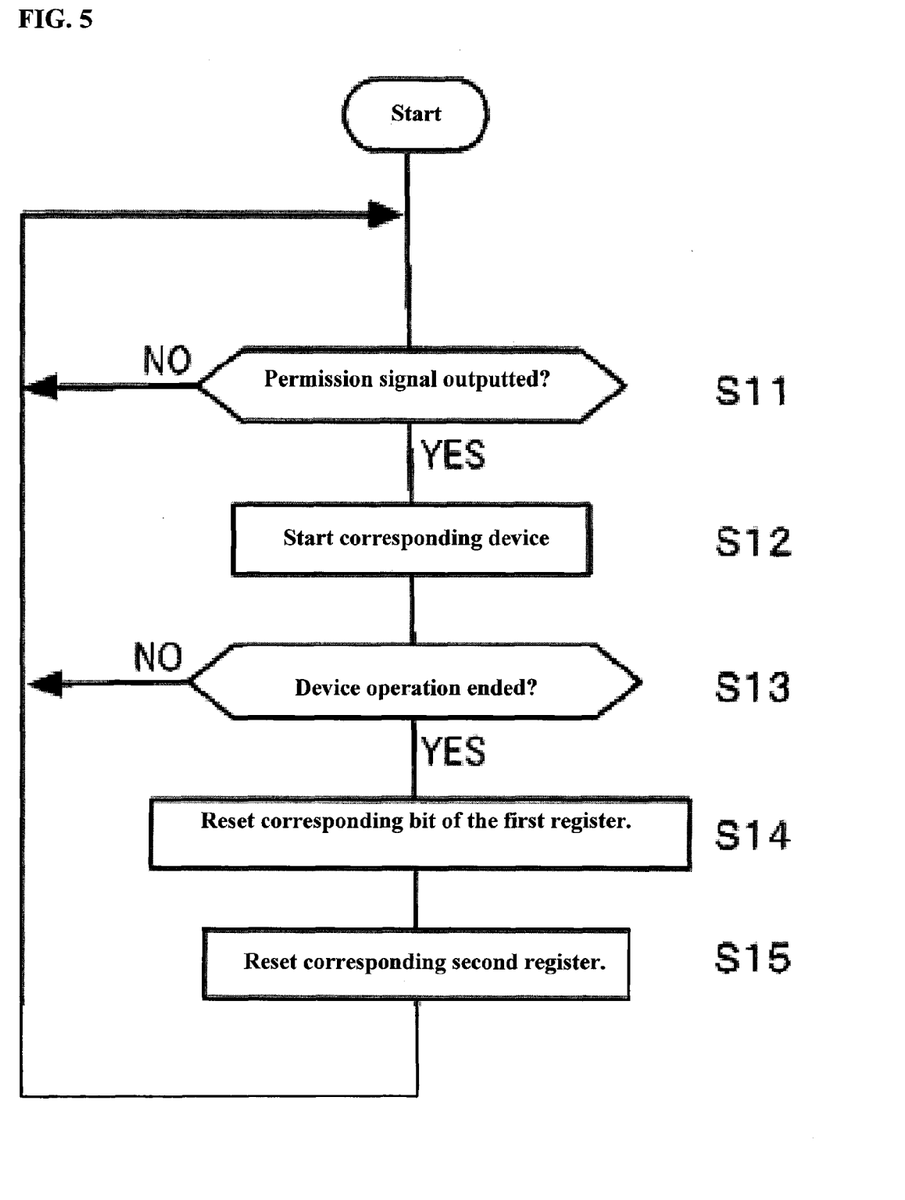
FIG. 5 is a flowchart for explaining the operation of the signal transmitting circuit.

The process for writing end-of-operation data to the register circuit 100 is explained next in reference to the flow chart in FIG. 5. The flow chart in FIG. 5 illustrates a process that the signal transmitting circuit 110 executes in hardware, executed instantly through logic.

If, in Step S11, a permission signal Run is outputted from the data latching circuit 114 (YES), then, in the device controlling circuit 130, the device corresponding to the permission signal Run is activated (S12).

On the other hand, if, in Step S13, the end of operation of a corresponding device is detected by the signal transmitting circuit 110 through the device controlling circuit 130 (YES), then the signal transmitting circuit 110 changes the corresponding first bit in the first register J to the end-of-operation data (which here is bit logic "0"). Similarly, the second bit of the second register assigned to the device wherein the operation has ended is also changed to the end-of-operation data.

(1) In this example, a first register J for controlling jointly the operations of a plurality of devices A through H is assigned, and second registers A through H for controlling individually the operations of the plurality of devices A through H are assigned as well. As a result, while it is possible to discern the operating states for all of these devices simultaneously through referencing the first register J, it is also possible to start the operation of an individual device promptly through the use of an individual second register A through H that corresponds to a device wherein the operation has ended.

(2) Given the example, in the register circuit 100 register J is assigned as the first register for simultaneous operation devices A through H, making it possible to start simultaneously the operations of the simultaneous operation devices A through H through writing activation data all at once to the first bits of the first register J.

(3) Given the example, if data that is read out from a second register that is specified by a specified address is activation data for activating any of the plurality of devices A through H, then the signal transmitting circuit 110 outputs a permission signal Run that enables the operation of the device assigned to the second register. This enables the easy activation of a device through writing activating data to the second register to which the device to be activated is assigned.

(4) In the example, if the operation has ended for any of the plurality of devices A through H, the signal transmitting circuit 110 changes, to end-of-operation data, the first bit in the first register that has been assigned to the device wherein the operation has ended. This enables the detection of the device operating state by reading the data of the first bit of the first device.

Another example according to the present invention relates to in the same inspecting device as in the above example, the structure pertaining to the device controlling unit is a CPU (central processing unit) that has been integrated into a single-chip substrate. Those structural elements that are identical to those set forth above, are assigned identical codes, and explanations thereof are omitted.

Figure 8:
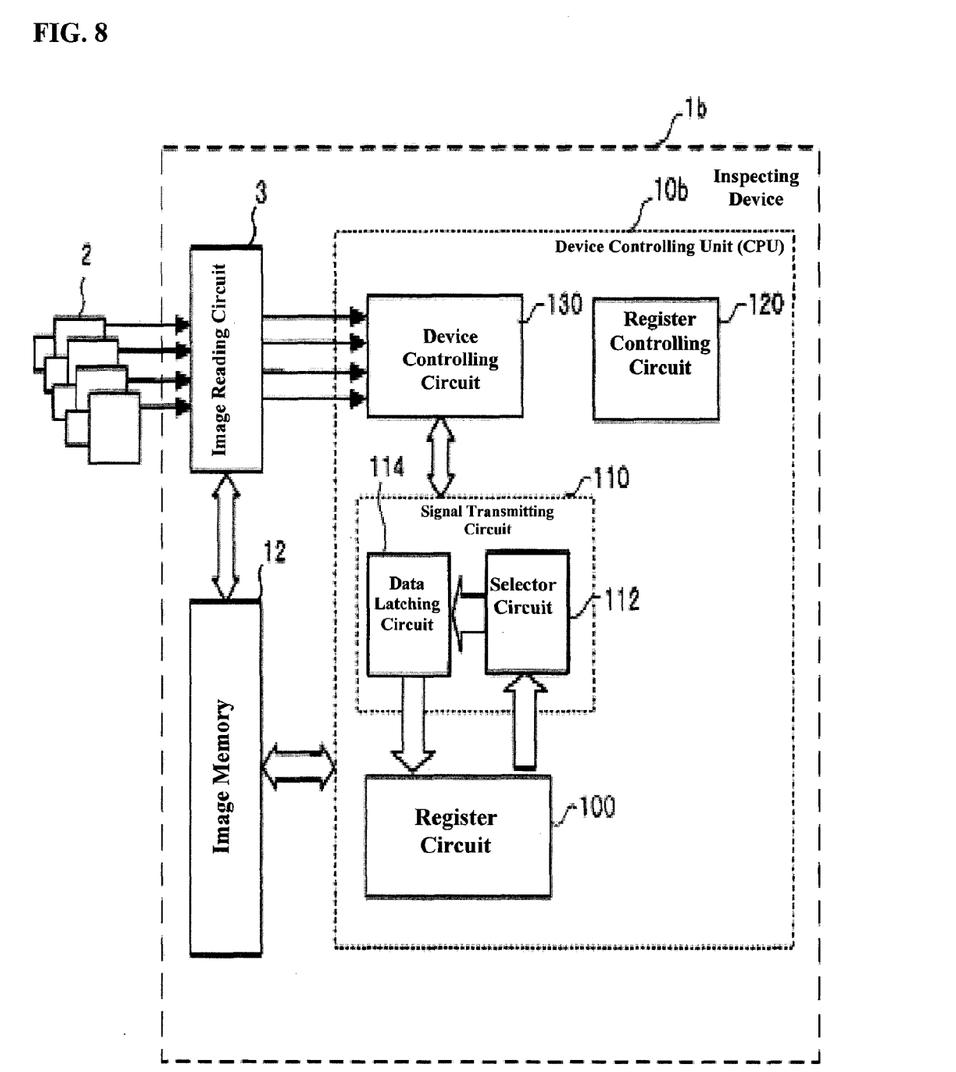
FIG. 8 is a structural diagram of an inspecting device that includes a device controlling unit of another example.

FIG. 8 illustrates the structure of the inspecting device 1 as set forth in the present example. As illustrated in FIG. 8, the inspecting device 1*b* includes a plurality of video cameras 2; an image reading circuit 3; a device controlling unit 10*b*, and an image memory 12.

The image reading circuit 3 is structured so as to be able to read image data from each of the plurality of video cameras 2, and so as to be able to send this image data to the image memory 12. Additionally, it is structured so as to be able to provide a notification to the device controlling circuit 130 that the reading of the image data has ended.

In the present example, the difference from the aforementioned example is, specifically, the point that the device controlling unit 10*b* is structured by integrating the register circuit 100, the signal transmitting circuit 110, the register controlling circuit 120, and the device controlling circuit 130 into a single substrate (for example, a semiconductor substrate). The functions of the individual circuits are as described above.

As described above, the device controlling device 10*b* is not only structured from individual components, but, as in the present example, can be structured as a CPU that is integrated into a single chip.

A further example according to the present invention has a distinctive feature in the point that a plurality of first registers is provided, assigned to different register circuits, in a structure that is similar to that of the above example.

Figure 9:
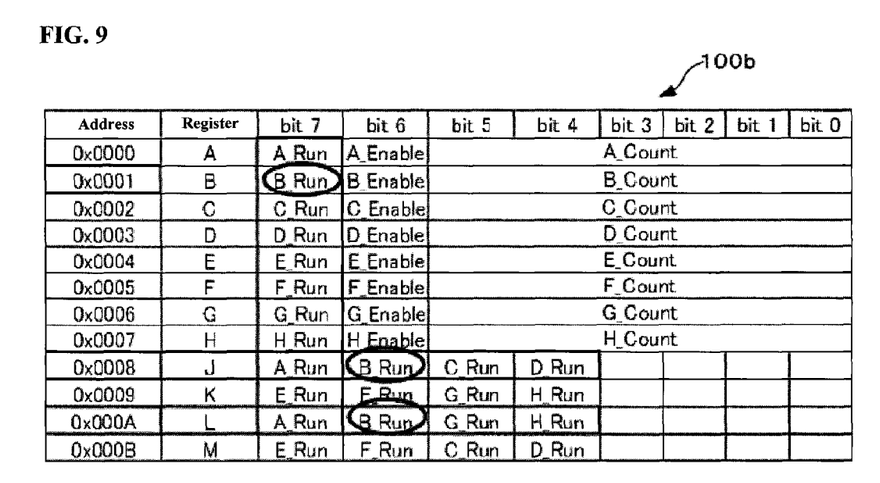
FIG. 9 is a register structure diagram for a register circuit according to a further example.

The present example differs from the examples described above, in the point that the register circuit 100 is assigned as illustrated in FIG. 9. The other structures are as described above, and explanations thereof are omitted.

FIG. 9 illustrates the details of the register assignments in the register circuit 100*b* in the present example. As illustrated in FIG. 9, the register circuit 100*b* is provided with, for example, registers A through M, each comprising eight bits. The registers A through M are structured so as to be accessible by, for example, the addresses 0x0000 through 0x00B. Of the registers A through M, register J (address 0x0008) is assigned as the first register (1), register K (address 00x0009) is assigned as the first register (2), register L (address 0x000A.) is assigned as the first register (3), and register M (address 0x000B) is assigned as the first register (4). The registers A through H being assigned as second registers is identical to the case described above.

In the first register (1) J, bit 7 through bit 4 are all assigned as a collection of first bits for detecting the operating states of a device A, a device B, a device C, and a device D. The first register (1) J is also a register for the simultaneous activation of the device A, device B, device C, and device D.

In the first register (2) K, bit 7 through bit 4 are all assigned as a collection of first bits for detecting the operating states of a device E, a device F, a device G, and a device H. The first register (2) K is also a register for the simultaneous activation of the device E, the device F, the device G, and the device H.

In the first register (3) L, bit 7 through hit 4 are all assigned as a collection of first bits for detecting the operating states of the device A, the device B, the device G, and the device H. The first register (3) F is also a register for the simultaneous activation of the device A, the device B, the device G, and the device H.

In the first register (4) M, bit 7 through bit 4 are all assigned as a collection of first bits for detecting the operating states of a device E, a device F, a device C, and a device D. The first register (4) M is also a register for the simultaneous activation of the device F, the device F, the device C, and the device D.

The register circuit 100*b* is structured as described above, thus enabling control by the register controlling circuit 120 as follows in the present third form of embodiment:

(1) To activate the individual devices A through H with individual timings, activation data is written to the individual second bits (bit 7) of the second registers A through H, Doing so enables the devices A through H that correspond to the second registers A through H, to which the activation data has been written, to be activated with arbitrary timing.

(2) If the device A, the device B, the device C, and the device D are to be activated simultaneously, then the activation data is written to the collection of first bits (bit 7 through 4) of the first register (1) J. The device A, the device B, the device C, and the device D can be activated simultaneously by writing activation data to the collection of first bits in the first register (1) J.

(3) If the device E, the device F, the device G, and the device H are to be activated simultaneously, then the activation data is written to the collection of first bits (bit 7 through 4) of the first register K. The device E, the device F, the device G, and the device ii can be activated simultaneously by writing activation data to the collection of first bits in the first register (2) K.

(4) If the device A, the device B, the device G, and the device H are to be activated simultaneously, then the activation data is written to the collection of first bits (bit 7 through 4) of the first register (3) L. The device A, the device B, the device G, and the device H can be activated simultaneously by writing activation data to the collection of first bits in the first register (3) L.

(5) If the device E, the device F, the device C, and the device are to be activated simultaneously, then the activation data is written to the collection of first bits (bit 7 through 4) of the first register (4) M. The device E, the device F, the device C, and the device D can be activated simultaneously by writing activation data to the collection of first bits in the first register (4) M.

In the above, the example provides a plurality of first registers, thus enabling not only the same effects of operation as is described above, but also enabling the combination of devices that are activated simultaneously to be selected and changed for each operation. This enables richer device operation control.

The present invention is not limited to the example set forth above, but rather can be modified as appropriate in a variety of ways in a range that produces the effects of operation of the present invention.

For example, white in the example set forth above, all eight devices were simultaneous activation devices, and in the further example set forth above, four devices were set as simultaneous activation devices, there is no limitation thereto, but rather devices of an arbitrary number not less than two can be used as simultaneous activation devices.

In the examples set forth above, the activating data and the end-of-operation data were both illustrated as single-bit data; however, there is no limitation thereto, and multiple bits may correspond to a single control data. Having multiple bits correspond to a single control data enables monitoring of three or more device operating states, and enables control of three or more different operations. For example, if the control data comprises 2 bits, that along with "activate" and "end-of-operation", for the operations, operating states such as "standby" and "N/A (no device)" can be monitored and these operations can be controlled, etc.

The device controlling unit according to the present invention can be applied to circuits and devices wherein device operations are controlled through registers.

I claim:

1. A device controlling unit for controlling at least a portion of operations of a plurality of devices, comprising:
a register circuit having a plurality of registers configured so as to enable writing and reading of data by specifying an address;
a register controlling circuit monitoring data of the plurality of registers of the register circuit, through specifying the address, and writing data to a register, determined in advance, of the register circuit to activate a device; and
a signal transmitting circuit causing one of the plurality of devices to perform a specific operation based on the specified address and on data read out from the register circuit; wherein:
in the register circuit, a collection of first bits for controlling jointly the individual operations of the plurality of devices is assigned to a first register, established in advance in the plurality of registers, and second bits for controlling individually the individual operations of the plurality of devices are respectively assigned to a plurality of respective second registers other than the first register.

2. The device controlling unit as set forth in claim 1, wherein:
the register controlling device writes, to a second bit of a second register that has been assigned to a device, data commanding an operation of the device, when any of the collection of first bits of the first register indicates that an operation of the device has ended.

3. The device controlling unit as set forth in claim 1, wherein:
the signal transmitting circuit outputs a permission signal allowing the operation of the device assigned to the second register, when data read from a second register, specified by a specified address, is data causing the operation of any of the plurality of devices.

4. The device controlling unit as set forth in claim 1, above, wherein:
the signal transmitting circuit writes, to a first bit of a first register that is assigned to a device that has ended an operation, data indicating the end of an operation of a device, when an operation of any of the plurality of devices has ended.

5. The device controlling unit as set forth in claim 1, wherein:
a device is a video camera, a counter, or a sequencer.

6. The device controlling unit as set forth in claim 1, wherein:
the register circuit uses at least a portion of bits other than bits used for controlling at least a portion of the operations of the plurality of devices as a counter for counting elapsed time from the beginning of operations of a plurality of devices.

7. A CPU that incorporates a device controlling unit as set forth in claim 1.

* * * * *